3,684,657
SELECTIVE MICROBIOLOGICAL DEGRADATION OF STEROIDAL 17-ALKYLS

Stephen Kraychy, Northbrook, William J. Marsheck, Arlington Heights, and Robert D. Muir, Glenview, Ill., assignors to G. D. Searle & Co., Chicago, Ill.
No Drawing. Filed May 11, 1970, Ser. No. 36,421
Int. Cl. C07c *167/18*
U.S. Cl. 195—51 G        12 Claims

ABSTRACT OF THE DISCLOSURE

A process is disclosed for preparing androst-4-ene-3,17-dione, androsta-1,4-diene-3,17-dione, and/or 20α-hydroxymethylpregna-1,4-dien-3-one by fermenting with Mycobacterium sp. N.R.R.L. B–3683 or enzymes thereof a steroid wherein carbon atom number 17 is substituted by alkyl.

---

This invention relates to the selective microbiological degradation of steroidal 17-alkyls. More particularly, this invention provides a process for preparing androst-4-ene-3,17-dione, androsta-1,4-diene-3,17-dione, and 20α-hydroxymethylpregna-1,4-dien-3-one by subjecting a steroid comprising a 17-alkyl to the enzymatic activity of a species of Mycobacterium. It has long been known that certain microorganisms can metabolize steroids such as cholest-5-en-3β-ol (cholesterol) having a 17-side chain; but the metabolites which result are commonly low molecular weight compounds, not steroids. Recently it has been found (see Dutch patent application No. 6608491) that 3-oxygenated steroids having 17-side chains containing 8–10 carbons can be fermented with various oxidizing microorganisms, including a species of Mycobacterium, to cleave the side chains and sometimes introduce 1,4 or 1,3,5(10) unsaturation without destroying steroidal integrity, provided the steroids are either 19-nor or oxygenated at carbon atom number 10 with hydroxyl, oxido, carboxy, aldehydo, or the like and, preferably, the microorganisms are preconditioned by cultivation in media containing a sterol such as cholest-5-en-3β-ol as the sole source of carbon. At about the same time, it was found (see Dutch patent application No. 6602662 and Steroids, 11, 401 (1968)) that steroids having carbonaceous 17-side chains can be fermented with species of Mycobacterium to produce androsta-1,4-diene-3,17-dione, provided the fermentations are carried out in the presence of an organic chelating agent such as 8-hydroxyquinoline, 2,2′-dipyridyl, 1,10-phenanthroline, cupferron, or β-naphthol. Further, it was found (see South African patent application No. 66/6220) that androst-4-ene-3,17-dione as well as androsta-1,4-diene-3,17-dione can be produced, provided an inorganic inhibitor such as nickel, cobalt, lead, cadmium, or selenite ion is substituted for the organic chelating agent.

The utility of such processes derives from, among other things, the fact that the products produced thereby are key intermediates in the synthesis of valuable steroidal hormones (see, for example, U.S. 3,274,182, wherein a process for making estrone from androsta-1,4-diene-3,17-dione is disclosed). The process of the present invention is the more useful because it provides access to the aforesaid intermediates from relatively cheap and readily available starting materials which need not be specially protected against undesirable attack during fermentation. No preliminary structural modification of the substrate, no chelating or inhibitory agents in the fermentation medium, nor any other comparably complicating and correspondingly costly procedural convolutions are necessary.

The microorganism thus uniquely adapted to the selective degradation of this invention is Mycobacterium sp. N.R.R.L. B–3683, available from the A.R.S. Culture Collection, 1815 North University St., Peoria, Ill. 61604. Fermented therewith, cholest-5-en-3β-ol, (24R)-24-methylcholest-5-en-3β-ol (campesterol), stigmast-5-en-3β-ol (β-sitosterol), stigmast-4-en-3-one (sitostenone), stigmasta-5,22-dien-3β-ol (stigmasterol), stigmasta-1,4-dien-3-one, stigmasta-4,22-dien-3-one, and like steroids comprising a 17-alkyl preferably but not necessarily exclusively containing 8 or more carbons are converted to androst-4-ene-3,17-dione, androsta-1,4-diene-3,17-dione, and/or 20α-hydroxymethylpregna-1,4-dien-3-one.

Fermentation is ordinarily carried out in the medium wherein the organism is cultured. However, it is likewise possible to separate the bacterial cells from the culture medium by centrifugation or other means and use the resultant cellular matter to implement the fermentation. Moreover, the cells can be ruptured ultrasonically or otherwise to facilitate access to enzymes present, which can be isolated by filtration or extracted with a solvent such as acetone or water and substituted for the organism or cells thereof.

A nutrient medium is required for culture of the organism, which is to say one containing assimilable nitrogen and carbon; and an adequate supply of sterile air should be maintained therein, for example by exposing a large surface of the medium to the air or preferably passing it through the medium in quantities sufficient to support submerged growth.

Suitable nitrogen sources are those normally employed for the purpose, including soy bean meal, corn steep liquor, meat extract, protein (optionally digested), peptone, yeast extract, distillers' solubles, casein hydrolysate, nitrate, and/or ammonium compounds. All of the foregoing materials excepting sometimes the last two serve also as carbon sources. Other carbon-containing substances satisfactory and conventionally used as nutrients are the carbohydrates, for example, glycerol, glucose, frustose, sucrose, lactose, maltose, inositol, dextrin, starch, and whey, among which inositol is additionally useful because of its unusual capacity to stimulate growth.

Phosphate, magnesium, and/or ferrous ions likewise may be incorporated in the culture medium as growth-promoting factors if desired; buffers may be added to assure that growth is initiated at a substantially neutral pH; and wetting agents may be employed to improve contact between the steroid and the fermenting agent. An anti-foaming agent is usually beneficial. Where isolated cells or enzymes are used to induce fermentation rather than the intact and growing organism, nutrients need not, of course, be present; but in either event the medium is customarily preponderantly aqueous.

Concentration of the steroid in the medium, as also fermentation time and temperature, can vary widely; and such operating conditions are to a certain extent interdependent. A preferred but acritical range of concentrations of the steroid in the medium is 0.01–1.0%, while fermentations of from 2 hours to 10 days duration at temperatures between 24 and 35° C. are representative. Manifestly, conditions must not be so stringent as to destroy the steroid, kill the organism prematurely, or inactivate the involved enzymes.

In a preferred embodiment of the invention, a nutrient medium is sterilized by heating at around 120° C. for 1 hour and then aerobically incubated at 30–32° C. with a culture of Mycobacterium sp. N.R.R.L. B–3683 for approximately 1 week, 0.1% of steroid being introduced after the first or second day when the culture has developed. Alternatively, the steroid is introduced prior to sterilizing or inoculation. Products of the resultant selective degradation are extracted with dichloromethane and isolated by chromatography.

The following examples are directed to illustrating, variously and in detail, this invention. However, the invention is not to be construed as limited thereby, either in spirit or in scope, since it will be apparent to those skilled in the art that many modifications, both of materials and of techniques, may be practiced without departing from the purpose and intent of this disclosure. In the examples hereinafter set forth, temperatures are given in degrees centigrade and relative amounts of materials in parts by weight, except as otherwise noted.

Yields are calculated according to the formula $$Y = \frac{100P}{Q(S-R)}$$

where Y represents percent yield, P weight of recrystallized product, Q molecular weight of product divided by molecular weight of substrate, S initial weight of substrate, and R weight of recovered substrate. Conversions are calculated according to the formula $$C = \frac{100P}{QS}$$

wherein C represents percent conversion and P, Q, and S retain the meanings previously assigned.

In Examples 11–21 and 24–27 hereinafter, distribution of the steroid throughout the medium is facilitated by introducing it in the form of a suspension prepared by ultrasonically dispersing each 5 parts thereof in 200 parts of water containing 0.1 part of polyoxyethylene sorbitan monooleate (Tween 80). Foaming is controlled by adding a dimethylpolysiloxane emulsion (Dow Corning Antifoam FG 10) to the medium prior to sterilization, 0.1 percent in Examples 1–2 and 4–27 and 0.02 percent in Example 3.

EXAMPLE 1

To a medium consisting of 25 parts of peptone, 15 parts of meat extract, 5 parts of yeast extract, 5 parts of dextrose, and 5000 parts of distilled water is added approximately 0.05 part of progesterone. The resultant mixture is sterilized by heating 1 hour at 121°, whereupon it is cooled to about 30° and then inoculated with 100 parts of a fluid culture of Mycobacterium sp. N.R.R.L. B–3683. The inoculated mixture is incubated at 30° for 30.5 hours while sterile air is passed through and the developing culture is agitated to induce submerged growth, at which point a solution of 5 parts of stigmast-4-en-3-one in 200 parts of acetone is introduced. Aerobic incubation with agitation at 30° is then resumed for 67.5 hours, whereupon the incubation mixture is extracted with dichloromethane. The extract is dried over anhydrous sodium sulfate and stripped of solvent by vacuum distillation. The residue is taken up in a minimum of 20:80 (by volume) ethyl acetate-cyclohexane. The resultant solution is chromatographed on dry silica gel, using 20:80 (by volume) ethyl acetate-benzene as a supplementary solvent. Materials identified via thin layer chromatography as androst-4-ene-3,17-dione, androsta-1,4-diene-3,17-dione, and stigmast-4-en-3-one are separately eluted with 15:85 (by volume) ethyl acetate-chloroform and isolated by evaporation of the solvent. Recrystallization from hexane affords a 44% yield of androst-4-ene-3,17-dione and a 12% yield of androsta-1,4-diene-3,17-dione.

EXAMPLE 2

To a medium as described in Example 1 is added 0.01 part of progesterone. The resultant mixture is sterilized by heating 1 hour at 121°, whereupon it is cooled to about 30° and then inoculated with 100 parts of a fluid culture of Mycobacterium sp. N.R.R.L. B–3683. The inoculated mixture is incubated at 30° for 30.5 hours while sterile air is passed through and the developing culture is agitated to induce submerged growth, at which point a solution of 5 parts of stigmast-4-en-3-one in 200 parts of acetone is introduced. Aerobic incubation with agitation at 30° is then resumed for 139 hours, whereupon the incubation mixture is extracted with dichloromethane. The extract is dried over anhydrous sodium sulfate and stripped of solvent by vacuum distillation. The residue is taken up in a minimum of 20:80 (by volume) ethyl acetate-benzene. The resultant solution is chromatographed on silica gel. Materials identified via thin layer chromatography as androst-4-ene-3,17-dione, androsta-1,4-diene-3,17 - dione, and stigmast-4-en-3-one are separately eluted with 15:85 (by volume) ethyl acetate-chloroform and isolated by evaporation of solvent. Consecutive recrystallization from ether-petroleum ether and ether affords an 18% yield of androsta-1,4-diene-3,17-dione melting at 138–141°.

EXAMPLE 3

To a medium as described in Example 1 is added 0.01 part of progesterone. The resultant mixture is sterilized by heating 1 hour at 121°, whereupon it is cooled to about 30° and then inoculated with 150 parts of a fluid culture of Mycobacterium sp. N.R.R.L. B–3683. The inoculated mixture is incubated at 31° for 46.5 hours while sterile air is passed through and the developing culture is agitated to induce submerged growth, at which point a solution of 5 parts of stigmast-4-en-3-one in 200 parts of acetone is introduced. Aerobic incubation with agitation at 31° is then resumed for 94 hours, whereupon the incubation mixture is extracted with dichloromethane. The extract is dried over anhydrous sodium sulfate and stripped of solvent by vacuum distillation. The residue is taken up in 8 volumes of hot benzene. The hot benzene solution is filtered, and to the hot filtrate is added approximately 1 part of hydroquinone dissolved in a minimum of boiling ethyl acetate. The precipitate which crystallizes out as the resultant mixture stands and cools is filtered off and suspended in 65 volumes of 1:1 (by volume) ethyl acetate-ether. The suspension is consecutively and thoroughly washed with 1:1 (by volume) aqueous 10% sodium sulfite-aqueous 4% sodium hydroxide, and water, dried over anhydrous sodium sulfate, and stripped of solvent by vacuum distillation. Recrystallization of the residue from acetone-hexane affords a 26% yield of androsta-1,4-diene-3,17-dione.

EXAMPLE 4

A medium consisting of 50 parts of corn steep liquor and approximately 5000 parts of distilled water adjusted to a pH of about 7.1 with aqueous potassium hydroxide is sterilized by heating 1 hour at 121°, whereupon it is cooled to about 30° and then inoculated with 100 parts of a fluid culture of Mycobacterium sp. N.R.R.L. B–3683. The inoculated mixture is incubated at 30° for 48 hours while sterile air is passed through and the developing culture is agitated to induce submerged growth, at which point a solution of 5 parts of stigmast-4-en-3-one in 200 parts of acetone is introduced. Aerobic incubation with agitation at 32° is then resumed for 96 hours, whereupon the incubation mixture is extracted with dichloromethane. The extract is dried over anhydrous sodium sulfate and stripped of solvent by vacuum distillation. Androsta-1,4-diene-3,17-dione is isolated from the residue as described in Example 3.

EXAMPLE 5

A medium consisting of 5 parts of yeast extract and 5 parts of disodium hydrogen phosphate dissolved in approximately 5000 parts of distilled water and adjusted to a pH of about 7.1 with aqueous potassium dihydrogen phosphate is sterilized by heating 1 hour at 121°, whereupon it is cooled to about 30° and then inoculated with 100 parts of a fluid culture of Mycobacterium sp. N.R.R.L. B–3683. The inoculated mixture is incubated at 32° for 48 hours while sterile air is passed through and the developing culture is agitated to induce submerged growth, at which point a solution of 3 parts of stigmast-4-en-3-one in 120 parts of acetone is introduced. Aerobic incubation with agitation at 32° is then resumed for 96 hours, whereupon the incubation mixture is extracted with dichloromethane. The extract is dried over anhydrous sodium sulfate and stripped of solvent by vacuum distillation. Androsta-1,4-diene-3,17-dione is isolated from the residue as described in Example 3.

EXAMPLE 6

To a medium consisting of 25 parts of peptone, 15 parts of meat extract, 5 parts of yeast extract and 5000 parts of tap water is added 15 parts of stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B-3683. The inoculated mixture is incubated at 32° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 30% ethyl acetate in benzene, on evaporation of solvent and recrystallization of the residues from a mixture of ethyl acetate and ether and from ethyl acetate alone, respectively, androsta-1,4-diene-3,17-dione melting at 140.5–142.5° and 20α-hydroxymethylpregna-1,4-dien-3-one melting at 179–180.5° are obtained.

EXAMPLE 7

To a medium as described in Example 6 is added 20 parts of crude soya residues (a mixture comprising 45–50% stigmast-5-en-3β-ol, 35–40% (24R)-24-methylcholest-5-en-3β-ol, and stigmasta-5,22-dien-3β-ol). The resultant mixture is sterilized by heating 1 hour at 121°, whereupon it is cooled to about 30° and then inoculated with 500 parts of a fluid culture of Mycobacterium sp. N.R.R.L. B-3683. The inoculated mixture is incubated at 32° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 30% ethyl acetate in benzene, on evaporation of solvent and recrystallization of the residues from a mixture of ethyl acetate and ether and from ethyl acetate alone, respectively, androsta-1,4-diene-3,17-dione melting at 140–143° and 20α-hydroxymethylpregna-1,4-dien-3-one melting at 181.5–183° are obtained.

EXAMPLE 8

To a mixture as described in Example 6 is added 5 parts of sitosterols N.F. The resultant mixture is sterilized by heating 1 hour at 121°, whereupon it is cooled to about 30° and then inoculated with 500 parts of a fluid culture of Mycobacterium sp. N.R.R.L. B-3683. The inoculated mixture is incubated at 31.5° for 174 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 20% ethyl acetate in benzene, on evaporation of solvent, androst-4-ene-3,17-dione is obtained as the residue. From eluates comprising 20–30% ethyl acetate in benzene, on evaporation of solvent and recrystallization of the residues from a mixture of acetone and ether, a 48% yield of androsta-1,4-diene-3,17-dione melting in the range 130–148° is obtained. From an eluate comprising 30% ethyl acetate in benzene, on evaporation of solvent and recrystallization of the residue from ethyl acetate, a 4% yield of 24α-hydroxymethylpregna-1,4-dien-3-one melting at 180–181.5° is obtained.

EXAMPLE 9

A medium as described in Example 6 is sterilized by heating 1 hour at 121°, whereupon it is cooled to about 30° and then inoculated with 500 parts of fluid culture of Mycobacterium sp. N.R.R.L. B-3683. The inoculated mixture is incubated at 31.5° for 174 hours while sterile air is passed through and the developing culture is agitated to induce submerged growth. During the first 106 hours, a solution of 5 parts of stigmast-5-en-3β-ol and 50 parts of polyoxyethylenepolyol fatty acid ester (Arlatone T) in 750 parts of water is introduced portionwise. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From an eluate comprising 30% ethyl acetate in benzene, on evaporation of solvent and recrystallization of the residue from a mixture of ethyl acetate and ether, androst-4-ene-3,17-dione melting at 153–161° is obtained. From eluates comprising 20–30% ethyl acetate in benzene, on evaporation of solvent and recrystallization of the residues from ether, androsta-1,4-diene-3,17-dione melting at 139–141° is obtained. From an eluate comprising 50% ethyl acetate in benzene, on evaporation of solvent and recrystallization of the residue from a mixture of ethyl acetate and ether, 20α-hydroxymethylpregna-1,4-dien-3-one melting at 172–176° is obtained.

EXAMPLE 10

A medium as described in Example 6 is sterilized by heating 1 hour at 121°, whereupon it is cooled to about 30° and then inoculated with 50 parts of a fluid culture of Mycobacterium sp. N.R.R.L. B-3683. The inoculated mixture is incubated at 31° for 20 hours while sterile air is passed through and the developing culture is agitated to induce submerged growth, at which point a solution of 5 parts of stigmast-4-en-3-one in 30 parts of acetone is introduced. Aerobic incubation with agitation at 31° is then resumed for 139 hours, whereupon the incubation mixture is extracted with dichloromethane. The extract is dried over anhydrous sodium sulfate and filtered through diatomaceous earth. The filtrate is stripped of solvent by vacuum distillation and the residue is taken up in benzene. The benzene solution is chromatographed on silica gel, using benzene and mixtures thereof with increasing amounts of ethyl acetate as developing solvent. From an eluate comprising 15% ethyl acetate in benzene, on evaporation of solvent, androst-4-en-3,17-dione is obtained as the residue. From eluates comprising 20–30% ethyl acetate in benzene, on evaporation of solvent and recrystallization of the residues from a mixture of acetone and ether, androsta-1,4-diene-3,17-dione melting at 136–138° is obtained.

EXAMPLE 11

To a medium as described in Example 6 is added 5 parts of a mixture of (24R)-24-methylcholest-5-en-3β-ol and stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B-3683. The inoculated mixture is incubated at 31° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation and the residue is taken up in benzene. The benzene solution is chromatographed on silica gel, using benzene and mixtures thereof with increasing amounts of ethyl acetate as developing solvent. From eluates comprising 15–20% of ethyl acetate in benzene, on evaporation of solvent and recrystallization of the residues from ethyl acetate, androsta-1,4-diene-3,17-dione melting at 137–140° is obtained. From an eluate comprising 30% ethyl acetate in benzene, on evaporation of solvent and recrystallization of the residue from ethyl acetate, 20α-hydroxymethylpregna-1,4-dien-3-one melting at 177–180° is obtained.

EXAMPLE 12

To a medium as described in Example 6 is added 10 parts of a mixture of (24R)-24-methylcholest-5-en-3β-ol and stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 192 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From an eluate comprising 20% ethyl acetate in benzene, on evaporation of solvent and recrystallization of the residue from ether, a 5% yield of androst-4-ene-3,17-dione melting at 168–171.5° is obtained. From eluates comprising 20–30% ethyl acetate in benzene, on evaporation of solvent and recrystallization of the residues from a mixture of ethyl acetate and ether, androsta-1,4-diene-3,17-dione melting at 138–140° is obtained. From eluates comprising 30–50% ethyl acetate in benzene, on evaporation of solvent and recrystallization of the residues from ethyl acetate, 20α-hydroxymethylpregna-1,4-dien-3-one melting at 179.5–181° is obtained.

EXAMPLE 13

To a medium as described in Example 6 is added 20 parts of a mixture of (24R)-24-methylcholest-5-en-3β-ol and stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 192 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 20–30% ethyl acetate in benzene, on evaporation of solvent and recrystallization of the residues from ether, androst-4-ene-3,17-dione melting at 169–171.5° is obtained. From eluates comprising 30–50% ethyl acetate in benzene, on evaporation of solvent and recrystallization of the residues from a mixture of ethyl acetate and ether, androsta-1,4-diene,3,17-dione melting at 140–142° is obtained. From eluates comprising 50% ethyl acetate in benzene, on evaporation of solvent and recrystallization of the residue from ethyl acetate, 20α-hydroxymethylpregna-1,4-dien-3-one melting at 174–177° is obtained.

EXAMPLE 14

To a medium as described in Example 6 is added 5 parts of cholest-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture in incubated at 31° for 144 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From eluates comprising 20–30% ethyl acetate in benzene, on evaporation of solvent and recrystallization of the residues from a mixture of acetone and ether, a 77% yield of androsta-1,4-diene-3,17-dione melting at 138–140° is obtained. From eluates comprising 30–50% ethyl acetate in benzene, on evaporation of solvent and recrystallization of the residues from a mixture of acetone and ether, a 4% yield of 20α-hydroxymethylpregna-1,4-dien-3-one melting at 178.5–180° is obtained.

EXAMPLE 15

To a medium as described in Example 6 is added 5 parts of stigmasta-5,22-dien-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From an eluate comprising 20% ethyl acetate in benzene, on evaporation of solvent and recrystallization of the residue from a mixture of ethyl acetate and ether, a 37% yield of androsta-1,4-diene-3,17-dione melting at 140–142° is obtained. From an eluate comprising 30% ethyl acetate in benzene, on evaporation of solvent and recrystallization of the residue from ethyl acetate, 20α-hydroxymethylpregna-1,4-dien-3-one melting at 179–181° is obtained.

EXAMPLE 16

To a medium consisting of 50 parts of casein hydrolysate, 50 parts of enzymatically digested meat protein, and 5000 parts of water adjusted to pH 7.1 with aqueous potassium hydroxide is added 5 parts of sitosterols N.F. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 192 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 20% ethyl acetate in benzene, on evaporation of solvent and recrystallization of the residue from a mixture of acetone and ether, androsta-1,4-diene-3,17- dione melting at 138–141° is obtained. From an eluate comprising 30% ethyl acetate in benzene, on evaporation of solvent and recrystallization of the residue from a mixture of acetone and ether, 20α-hydroxymethylpregna-1,4-dien-3-one melting at 174.5–176° is obtained.

EXAMPLE 17

To a medium consisting of 25 parts of meat peptone, 25 parts of meat protein, 25 parts of yeast extract, 10 parts of dipotassium hydrogen phosphate, 5 parts of magnesium sulfate, 0.5 part of ferrous sulfate, heptahydrate, and 5000 parts of water is added 5 parts of sitosterols N.F. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 32° for 120 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 15–20% ethyl acetate in benzene, on evaporation of solvent and recrystallization of the residues from a mixture of ethyl acetate and ether, androsta-1,4-diene-3,17-dione melting at 140–141.5° is obtained. From eluates comprising 20–30% ethyl acetate in benzene, on evaporation of solvent and recrystallization of the residues from a mixture of ethyl acetate and ether, 20α-hydroxymethylpregna-1,4-dien-3-one melting at 180.5–172° is obtained.

EXAMPLE 18

To a medium consisting of 25 parts of meat peptone, 25 parts of meat protein, 25 parts of yeast extract, and 5000 parts of water adjusted to pH 7 with aqueous sodium hydroxide is added 5 parts of stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 30° for 120 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 15% ethyl acetate in benzene, on evaporation of solvent and recrystallization of the residue from a mixture of acetone and ether, a 42% yield of androsta-1,4-diene-3,17-dione melting at 139.5–141° is obtained. From an eluate comprising 20% ethyl acetate in benzene, on evaporation of solvent and recrystallization of the residue from a mixture of acetone and ether, 20α-hydroxymethylpregna-1,4-dien-3-one melting at 180–181.5° is obtained.

EXAMPLE 19

To a medium consisting of 25 parts of meat peptone, 25 parts of yeast extract, and 5000 parts of water is added 5 parts of (24R)-24-methylcholest-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 30° for 120 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 15% ethyl acetate in benzene, on evaporation of solvent, androst-4-ene-3,17-dione is obtained as the residue. From eluates comprising 15–20% ethyl acetate in benzene, on evaporation of solvent and recrystallization of the residues from a mixture of acetone and ether, a 43% yield of androsta-1,4-diene-3,17-dione melting at 139.5–141° is obtained. From eluates comprising 20–30% ethyl acetate in benzene, on evaporation of solvent and recrystallization of the residues from a mixture of acetone and ether, 20α-hydroxymethylpregna-1,4-dien-3-one melting at 178–179.5° is obtained.

EXAMPLE 20

To a medium consisting of 50 parts of yeast extract and 5000 parts of water is added 5 parts of stigmast-5-en-3β-ol. The resultant mixture is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 168 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvent. From an eluate comprising 15% ethyl acetate in benzene, on evaporation of solvent, a mixture of androst-4-ene-3,17-dione and androsta-1,4-diene-3,17-dione is obtained as the residue. From an eluate comprising 20% ethyl acetate in benzene, on evaporation of solvent and recrystallization of the residue from ethyl acetate, 20α-hydroxymethylpregna-1,4-dien-3-one melting at 179–181° is obtained.

EXAMPLE 21

A medium consisting of 25 parts of enzymatically digested protein and 5000 parts of water adjusted to pH 7 with aqueous sodium hydroxide is sterilized by heating 1 hour at 121°, whereupon it is cooled to about 30° and then inoculated with 500 parts of a fluid culture of Mycobacterium sp. N.R.R.L. B–3683. The inoculated mixture is incubated at 31° for 4 hours while sterile air is passed through and the developing culture is agitated to induce submerged growth, at which point a solution of 5 parts of stigmast-5-en-3β-ol in 250 parts of water is introduced. Aerobic incubation with agitation at 31° is then resumed for 214 hours, whereupon the incubation mixture is extracted with dichloromethane. The extract is dried over anhydrous sodium sulfate and stripped of solvent by vacuum distillation. The residue is taken up in benzene. The benzene solution is chromatographed on silica gel, using benzene and mixtures thereof with increasing amounts of ethyl acetate as developing solvents. From an eluate comprising 20% ethyl acetate in benzene, on evaporation of solvent and recrystallization of the residue from ether, androsta-1,4-diene-3,17-dione melting at 140.5–144° is obtained. From eluates comprising 30–50% ethyl acetate in benzene, on evaporation of solvent and recrystallization of the residues from ethyl acetate, 20α-hydroxymethylpregna-1,4-dien-3-one melting at 181–184° is obtained.

EXAMPLE 22

To a medium as described is Example 6 is added 4 parts of stigmasta-1,4-dien-3-one. The resultant mixture is sterilized by heating 1 hour at 121°, whereupon it is cooled to about 30° and then inoculated with 250 parts of a fluid culture of Mycobacterium sp. N.R.R.L. B–3683. The inoculated mixture is incubated at 31° for 165 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 20% ethyl acetate in benzene, on evaporation of solvent and recrystallization of the residue from a mixture of acetone and ether, a 33% yield of androsta-1,4-diene-3,17-dione melting at 140–142° is obtained. From an eluate comprising 30% ethyl aceate in benzene, on evaporation of solvent and recrystallization of the residue from a mixture of acetone and ether, 20α-hydroxymethylpregna-1,4-dien-3-one melting at 181–182.5° is obtained.

EXAMPLE 23

To a medium as described in Example 1 is added 0.01 part of progesterone. The resultant mixture is sterilized by heating 1 hour at 121°, whereupon it is cooled to about 30° and then inoculated with 100 parts of a fluid culture of Mycobacterium sp. N.R.R.L. B–3683. The inoculated mixture is incubated at 32° for 48 hours while sterile air is passed through and the developing culture is agitated to induce submerged growth, at which point a solution of 5 parts of stigmast-4-en-3-one in 200 parts of acetone is introduced. Aerobic incubation with agitation at 32° is then resumed for 123.5 hours, whereupon the incubation mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From an eluate comprising 15% ethyl acetate in benzene, on evaporation of the solvent and recrystallization of the residue from ether, androst-4-ene-3,17-dione melting at 166–169.5° is obtained. From a second eluate comprising 15% ethyl acetate in benzene, on evaporation of solvent, a 44% yield of androsta-1,4-diene-3,17-dione is obtained as the residue.

EXAMPLE 24

To a medium as described in Example 6 is added 5 parts of stigmasta-4,22-dien-3-one. The resultant mixture is sterilized by heating 1 hour at 121°, whereupon it is cooled to about 30° and then inoculated with 250 parts of a fluid culture of Mycobacterium sp. N.R.R.L. B–3683. The inoculated mixture is incubated at 30° for 240 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 20–30% ethyl acetate in benzene, combined and freed of solvents by evaporation, a 39% yield of androsta-1,4-diene-3,17-dione is obtained as the residue.

EXAMPLE 25

To a medium consisting of 25 parts of enzymatically digested protein, 5 parts of yeast extract, 5 parts of i-inositol, 10 parts of dipotassium hydrogen phosphate whereby pH is brought to 7.4, and 5000 parts of water is added 5 parts of sitosterol N.F. The resultant mixture is sterilized by heating 1 hour at 121°, whereupon it is cooled to about 30° and then inoculated with 250 parts of a fluid culture of Mycobacterium sp. N.R.R.L. B–3683. The inoculated mixture is incubated at 30° for 216 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 15–20% ethyl acetate in benzene, on evaporation of solvent and recrystallization of the residues from a mixture of acetone and ether, a 46% yield of androsta-1,4-diene-3,17-dione melting at 138.5–141.5° and representing a 43% conversion of the substrate is obtained. From eluates comprising 20–30% ethyl acetate in benzene, on evaporation of solvents and recrystallization of the residue from a mixture of acetone and ether, 20α-hydroxymethylpregna-1,4-dien-3-one is obtained.

EXAMPLE 26

To a medium consisting of 25 parts of peptone, 15 parts of meat extract, 5 parts of yeast extract, 5 parts of i-inositol, and 5000 parts of water is added 25 parts of polyoxyethylene sorbitan monolaurate (Tween 20) and 5 parts of sitosterols N.F. The resultant mixture is sterilized by heating 1 hour at 121°, whereupon it is cooled to about 30° and then inoculated with 250 parts of a fluid culture of Mycobacterium sp. N.R.R.L. B–3683. The inoculated mixture is incubated at 30° for 236 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 15–20% ethyl acetate in benzene, on evaporation of solvent and recrystallization of the residues from a mixture of acetone and ether, androsta-1,4-diene-3,17-dione melting at 140–142° is obtained. From eluates comprising 20–30% ethyl acetate in benzene, on evaporation of solvent and recrystallization of the residues from a mixture of acetone and ether, 20α-hydroxymethylpregna-1,4-dien-3-one is obtained.

EXAMPLE 27

To a medium as described in Example 26 is added 25 parts of polyoxyethylene sorbitan monopalmitate (Tween 40) and 5 parts of sitosterols N.F. The resultant mixture is sterilized by heating 1 hour at 121°, whereupon it is cooled to about 30° and then inoculated with 250 parts of a fluid culture of Mycobacterium sp. N.R.R.L. B–3683. The inoculated mixture is incubated at 30° for 236 hours while sterile air is passed through and the developing culture is agitated to induce submerged growth. Following incubation, the mixture is extracted with dichloromethane. The extract is dried over anhydrous sodium sulfate and filtered through diatomaceous earth. The filtrate is stripped of solvent by vacuum distillation, and the residue is taken up in benzene. The benzene solution is chromatographed on silica gel, using benzene and mixtures thereof with increasing amounts of ethyl acetate as developing solvents. From eluates comprising 15–20% ethyl acetate in benzene, on evaporation of solvent and recrystallization of the residues from a mixture of acetone and ether, androsta-1,4-diene-3,17-dione melting at 138–140.5° and representing a 44% conversion of substrate is obtained. From an eluate comprising 30% ethyl acetate in benzene, on evaporation of solvent and recrystallization of the residue from a mixture of acetone and ether, 20α-hydroxymethylpregna-1,4-dien-3-one melting at 174–176° is obtained.

EXAMPLE 28

A medium consisting of 2.5 parts of peptone, 1.5 parts of meat extract, 0.5 part of yeast extract, and 500 parts of water is sterilized by heating 1 hour at 121°, whereupon it is cooled to about 30° and then inoculated with 50 parts of a fluid culture in Mycobacterium sp. N.R.R.L. B–3683. The inoculated mixture is incubated at approximately 26° for 5 days while subjected to sufficient agitation to initiate and sustain aerobic submerged growth. The resultant mixture is centrifuged; and the cellular matter thus isolated is washed by suspension in 120 parts of physiological saline, again isolated by centrifugation and finally resuspended in 30 parts of an aqueous 1.7% solution of dipotassium hydrogen phosphate adjusted to pH 7 with an aqueous 1.4% solution of potassium dihydrogen phosphate. The latter suspension is subjected to ultrasonification sufficient to rupture cell walls, whereupon insoluble matter is removed by centrifugation and the clear liquid which remains is aerobically incubated at 31° for 24 hours with an ultrasonically induced suspension of 0.03 part of sitosterols N.F. in 3 parts of water containing 0.002 part of polyoxyethylene sorbitan monooleate (Tween 80) preliminarily sterilized by heating for half an hour at 121°. Analysis via gas chromatography of a dichloromethane extract of the mixture thus obtained shows a substantial content of androsta-1,4-diene-3,17-dione.

What is claimed is:

1. The process of preparing androst-4-ene-3,17-dione, androsta - 1,4 - diene - 3,17-dione, 20α-hydroxymethylpregna-1,4-dien-3-one, or a mixture thereof by fermenting a steroid containing at least 8 carbons in the 17-side chain with Mycobacterium sp. N.R.R.L. B–3683 or enzymes derived therefrom.

2. The process of claim 1 wherein the steroid containing at least 8 carbons in the 17-side chain is of the cholestane or stigmastane series.

3. The process of claim 1 wherein the steroid containing at least 8 carbons in the 17-side chain is cholest-5-en - 3β-ol, (24R)-24-methylcholest-5-en-3β-ol, stigmast-5-en-3β-ol, stigmast-4-en-3-one, stigmasta-5,22-dien-3β-ol, stigmasta-1,4-dien-3-one, or stigmasta-4,22-dien-3-one.

4. The process of claim 1 wherein one or more members of the group consisting of cholest-5-en-3β-ol, (24R)-24-methylcholest-5-en-3β-ol, stigmast-5-en-3β-ol, stigmast-4-en-3-one, stigmasta-5,22-dien-3β-ol, stigmasta-1,4-dien-3-one, and stigmasta-4,22-dien-3-one is aerobically incubated wtih Mycobacterium sp. N.R.R.L. B–3683 in a nutrient medium.

5. The process of claim 1 wherein cholest-5-en-3β-ol is aerobically incubated with Mycobacterium sp. N.R.R.L. B–3683 in a nutrient medium.

6. The process of claim 1 wherein a mixture of (24R)-24-methylcholest-5-en-3β-ol, stigmast-5-en-3β-ol, and stigmasta-5,22-dien-3β-ol is aerobically incubated wtih Mycobacterium sp. N.R.R.L. B–3683 in a nutrient medium.

7. The process of claim 1 wherein a mixture of (24R)-24 - methylcholest-5-en-3β-ol and stigmast-5-en-3β-ol is aerobically incubated with Mycobacterium sp. N.R.R.L. B–3683 in a nutrient medium.

8. The process of claim 1 wherein stigmast-5-en-3β-ol is aerobically incubated with Mycobacterium sp. N.R.R.L. B–3683 in a nutrient medium.

9. The process of claim 1 wherein stigmast-4-en-3-one is aerobically incubated with Mycobacterium sp. N.R.R.L. B–3683 in a nutrient medium.

10. The process of claim 1 wherein stigmasta - 5,22-dien-3β-ol is aerobically incubated with Mycobacterium sp. N.R.R.L. B–3683 in a nutrient medium.

11. The process of claim 1 wherein stigmasta-1,4-dien-3-one is aerobically incubated with Mycobacterium sp. N.R.R.L. B–3683 in a nutrient medium.

12. The process of claim 1 wherein stigmasta-4,22-dien-3 - one is aerobically incubated with Mycobacterium sp. N.R.R.L. B–3683 in a nutrient medium.

References Cited
UNITED STATES PATENTS 3,388,042  6/1968  Arima et al. _____ 195—51 G ALVIN E. TANENHOLTZ, Primary Examiner